(12) United States Patent
Crescenzo

(10) Patent No.: US 10,455,856 B2
(45) Date of Patent: Oct. 29, 2019

(54) METHOD AND MACHINE FOR PITTING AND RE-PITTING FRUIT HALVES

(71) Applicant: Biagio Crescenzo, Montecorvino Pugliano (IT)

(72) Inventor: Biagio Crescenzo, Montecorvino Pugliano (IT)

( * ) Notice: Subject to any disclaimer, the term of this patent is extended or adjusted under 35 U.S.C. 154(b) by 0 days.

(21) Appl. No.: 16/068,948

(22) PCT Filed: Jan. 10, 2017

(86) PCT No.: PCT/IB2017/050112
§ 371 (c)(1),
(2) Date: Jul. 10, 2018

(87) PCT Pub. No.: WO2017/122118
PCT Pub. Date: Jul. 20, 2017

(65) Prior Publication Data
US 2019/0029309 A1 Jan. 31, 2019

(30) Foreign Application Priority Data
Jan. 11, 2016 (IT) .................. UB2016A009904

(51) Int. Cl.
*A23N 3/04* (2006.01)
*A23N 4/04* (2006.01)
*A23N 4/24* (2006.01)

(52) U.S. Cl.
CPC .............. *A23N 3/04* (2013.01); *A23N 4/04* (2013.01); *A23N 4/24* (2013.01)

(58) Field of Classification Search
CPC ............... A23N 3/04; A23N 4/04; A23N 4/24
See application file for complete search history.

(56) References Cited

U.S. PATENT DOCUMENTS

| 2,673,584 A | 3/1954 | Skog |
| 2,788,818 A * | 4/1957 | Skog ........................ A23N 4/04 198/383 |
| 2,981,410 A | 4/1961 | Perrelli |

(Continued)

FOREIGN PATENT DOCUMENTS

| WO | 9926735 A1 | 6/1999 |
| WO | 2015136420 A1 | 9/2015 |

*Primary Examiner* — Anthony J Weier
(74) *Attorney, Agent, or Firm* — Browdy and Neimark, P.L.L.C.

(57) ABSTRACT

A method for pitting and re-pitting fruit halves, in particular peach halves, has steps of lifting fruit halves from a loading area to a feeding zone, feeding the fruit halves to an advancing lane, moving the fruit halves forward, detecting the supporting condition of each fruit half and a presence of pit or pit fragments, if any, assessing the supporting condition as correct or incorrect, communicating the presence of pit or pit fragments, if any, in the fruit half, pit removing, if any, delivering the fruit halves to their further treatment or bringing them back to the step of lifting the fruit halves, in case their supporting condition is assessed as incorrect. There is shown a multi-lane machine having a detecting station (9), a control unit (10), communication means for sending information to a cutting station (8) and to a separating station (13) for delivering the fruit halves to their further treatment or to the loading area of the machine.

11 Claims, 4 Drawing Sheets

(56) References Cited

U.S. PATENT DOCUMENTS

| | | | |
|---|---|---|---|
| 3,005,549 A | 10/1961 | Flanders | |
| 3,085,672 A * | 4/1963 | Wurgaft | A23N 4/04 198/383 |
| 3,515,273 A | 6/1970 | Seaborn | |
| 3,643,717 A | 2/1972 | Meissner et al. | |
| 3,695,322 A | 10/1972 | Anderson et al. | |
| 4,025,422 A | 5/1977 | Malvick | |
| 4,666,045 A * | 5/1987 | Gillespie | B07C 5/365 209/558 |
| 5,748,324 A * | 5/1998 | Howarth | B07C 5/3422 198/382 |
| 6,225,620 B1 * | 5/2001 | Campbell | B07C 5/3422 209/557 |
| 2002/0008055 A1 * | 1/2002 | Campbell | B07C 5/3422 209/577 |

\* cited by examiner

METHOD AND MACHINE FOR PITTING AND RE-PITTING FRUIT HALVES

TECHNICAL FIELD

The present invention relates to a method for pitting and re-pitting fruit halves, in particular peach halves. Further, the invention describes a multiple lane machine for embodying the method.

BACKGROUND ART

U.S. Pat. No. 3,695,322, issued to Anderson et al. of FMC Corporation on 3 Oct. 1972, discloses a discontinuously operating apparatus for pitting peaches including a shuffle feeder, a multiple lane conveyor having fruit holding flights, an orienting station to align the peaches so that their suture plans are transverse to the direction of their movement along the apparatus, and a cutting station for cutting in half the peaches and separating the pits.

The application PCT/IB2015/051641 describes a machine for recognizing and orienting fruits, especially peaches, for their automatic pitting, comprising a fruit holding flight conveyor in which a belt having fruit multiple lanes and being constituted by mesh members and fruit holding flights, advances longitudinally in a frame from a feeding station up to a cutting station, the fruit holding flights being shaped with a number of recesses. The machine according to the cited patent application also includes a fruit recognizing station that is suitable to detect the position of the vertical suture plane, to calculate the angle between the suture line and the cutting line corresponding to the dihedral angle formed between the vertical suture plane and the vertical cutting plane, and to communicate either information on the calculated dihedral angle or information of detection failure.

U.S. Pat. No. 3,005,549 relates to the detection of fragmented pits in peach halves that are positioned protruding in fruit holding flights with their convex part facing upwards, and describes means for determining the translucency of the peaches and then classifying the peach halves having a pit fragment. This means comprises a monitoring station including a radiation source spaced from radiation detection means for the above detection. In particular, the peach halves are transferred with their convex part facing said radiation source and with their concave facing said detection means that senses the radiation transmitted through the peach halves.

U.S. Pat. No. 3,643,717 discloses a pitter for removing pits from peaches, in which conveyor and orienting means is provided for delivering a plurality of drupe halves having pits or pit halves therein to pit removing devices that operate in synchronism with the delivery of the drupe halves thereto. The conveyor and orienting means automatically adjusts the positions of the drupe halves for pitting, and the conveyor means holds them for resisting rotation while applying a rotary force to the pits relative to said drupe halves to remove said pits.

U.S. Pat. No. 2,673,584 discloses pitting mechanisms for pitting half peaches which eliminate the necessity for raising and lowering a pitting head, thereby permitting a faster pitting without stopping the progress of the fruit holder.

SUMMARY OF THE INVENTION

An object of the present invention is to detect the supporting condition of fruit halves, in particular peach halves, on recesses of fruit holding flights of a conveyor, in order to check that their convex part lays in the recess in a correct position.

Another object of the invention is to check the presence of a pit or pit fragments on each individual peach half.

Still another object is to remove the pit or the fragments thereof from each peach half at the cutting station of each peach half feeding lane, cutting station that has received information about the correct position of the peach half and about the presence of the pit or pit fragments therein.

Further, an object of the present invention is to separate the peach halves which have advanced in the correct position and have undergone, if any, a removal of the pit or pit fragments from the other peach halves which have not advanced in the correct position.

Still another object of the invention is to deliver the peach halves which have advanced in the correct position to their further treatment and to bring back the peach halves which have not advanced in the correct position to the feeding station of the peach halves in the machine.

The objects are achieved by the present invention that in a first embodiment thereof describes a method for pitting and re-pitting fruit halves, in particular peach halves comprising the steps of lifting fruit halves from a loading area to a feeding zone, feeding the fruit halves to an advancing lane, moving the fruit halves forward, removing the pit or fragments thereof from the fruit halves, and delivering the fruit halves to their further processing. Further, the method comprises:

- detecting the supporting condition of each fruit half on its advancing lane for the next cutting, and a presence of pit or pit fragments, if any, in the fruit half;
- assessing said supporting condition as correct or incorrect;
- communicating the presence of pit, or fragments thereof, if any, in the fruit half, as a useful information for the step of removing the pit or pit fragments and for the step of delivering the fruit halves to their further treatment; and
- bringing the fruit halves back to the fruit half lifting step, in case their supporting condition is assessed as incorrect.

In a second aspect, the invention discloses a multiple lane machine for pitting and re-pitting fruit halves, in particular peaches, comprising a loading tank, an inclined belt with profiles, a shuffle feeder, a fruit holding flight conveyor in which a belt composed of mesh elements and fruit holding flights advances in a longitudinal frame of the machine up to a cutting station, which is provided with knives for removing the pit or pit fragments from fruit halves. The machine further comprises:

- a detecting station for detecting the supporting condition of each fruit half on its advancing lane to the next cutting, and a presence of pit or pit fragments, if any, in the fruit half;
- a control unit for assessing as correct or incorrect the supporting condition of the fruit half;
- communication means for sending information about the presence of the pit or the pit fragments, if any, in the fruit half, to the cutting station for removing the pit or the pit fragments, and to a separating station for delivering the fruit halves to their further treatment; and
- conveying means for bringing the fruit halves back to the loading tank, in case their supporting condition is assessed as incorrect.

BRIEF DESCRIPTION OF DRAWINGS

Further features and advantages of the present invention will become more apparent from the indicative, and therefore non-limiting, description of embodiments of a multiple lane machine for pitting and re-pitting fruit halves, in particular peaches, as illustrated in the accompanying drawings in which.

DETAILED DESCRIPTION OF EMBODIMENTS OF THE INVENTION

Figure 1:
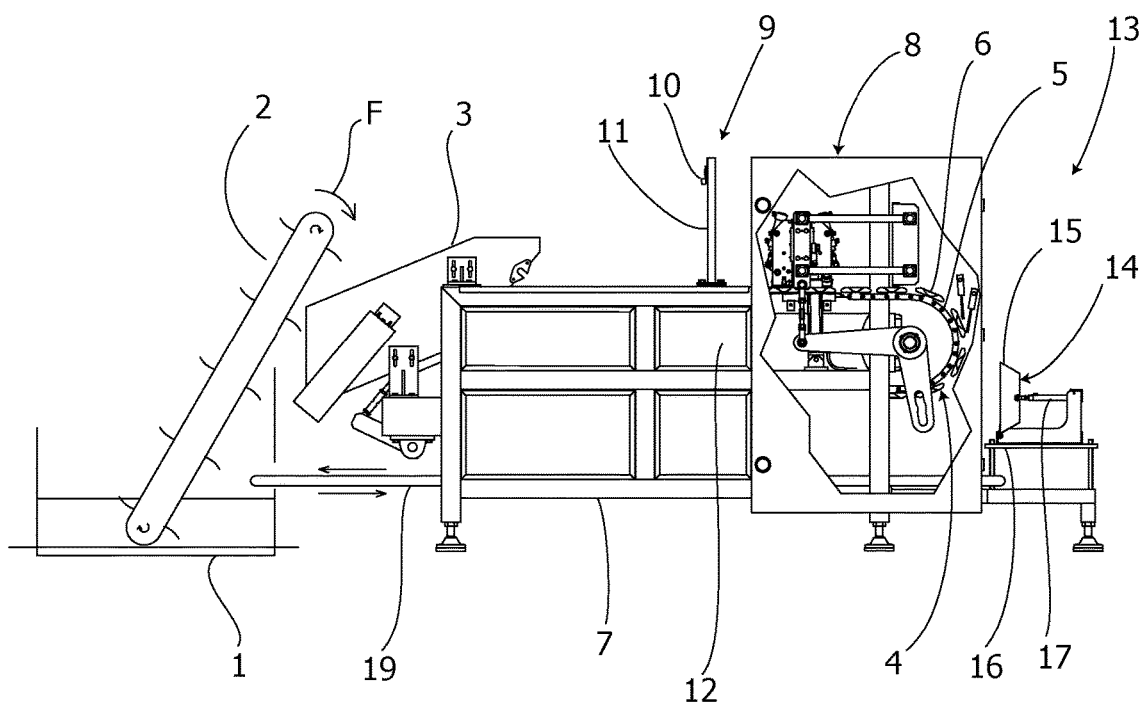
FIG. 1 is a schematic partially cross-sectioned side view of a first embodiment of the multiple lane machine for pitting and re-pitting fruit halves according to the present invention.
Figure 2:
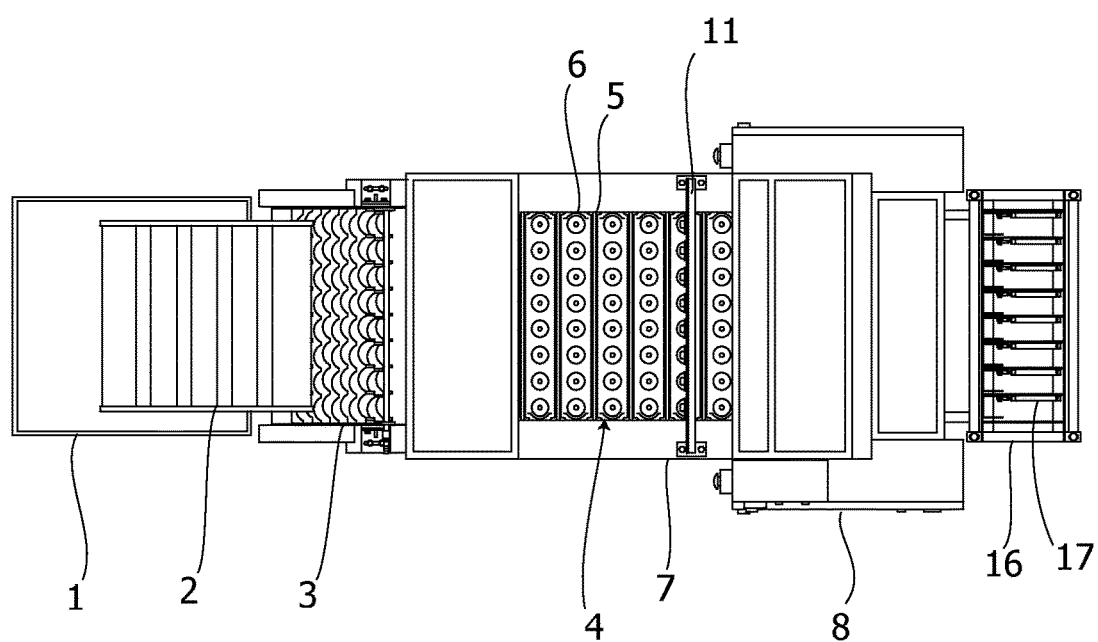
FIG. 2 is a top plan view of machine in FIG. 1, but with parts removed with respect to the latter, for clarity sake.

Reference is initially made to FIGS. 1 and 2 which represent a schematic partially cross-sectioned side view, and a top plan view of a first embodiment of the multiple lane machine for pitting and re-pitting fruit halves according to the present invention.

Conventionally, the machine, in particular, for pitting and re-pitting peaches comprises a loading tank 1, an inclined belt 2 with profiles, as an example of fruit half elevator, a shuffle feeder 3, and a fruit holding flight conveyor 4.

Conventionally, the fruit holding flight conveyor 4 comprises a belt composed of mesh elements 5 and fruit holding flights 6 and advances in a longitudinal frame 7 of the machine up to a cutting station 8, equipped with knives (not shown) for the removal of the pit or pit fragments from fruit halves P. According to the invention, arranged upstream of the cutting station 8 is a detecting station 9 for detecting the supporting condition of each fruit half on its advancing lane to the next cutting, and the presence of pit or pit fragments, if any, in the fruit half which is not shown.

The detecting station 9 is constituted by a plurality of cameras 10, one for each advancing lane of the fruit halves P, the cameras 10 being mounted on a portal 11 fixed transversely to said longitudinal frame of the machine.

Further, a control unit 12 is provided for evaluating the supporting condition as correct or incorrect.

Provided moreover are means of communication (not shown) for communicating the presence of the pit or pit fragments in the fruit half, to the cutting station and to a separating station 13 for delivering the fruit halves P to their further treatment.

Figure 3:
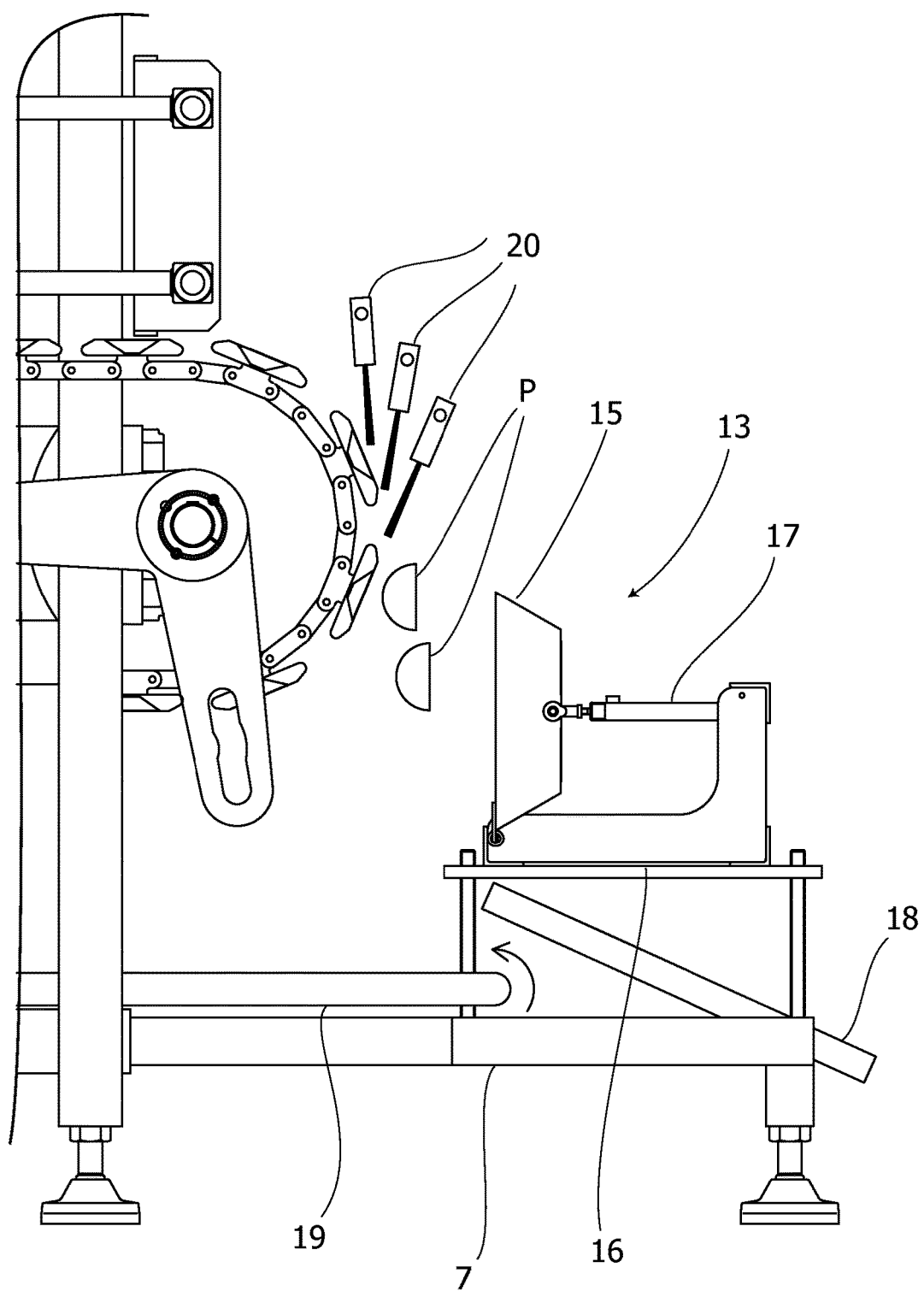
FIG. 3 is an enlarged detail of an end part of the machine in FIG. 1, without cover.

Referring also to FIG. 3, which is an enlarged detail of an end part of the machine in FIG. 1, without cover, a separating station 13 comprises a plurality of selective discharge units 14, one for each advancing lane of fruit halves P. Each selective discharge unit 14 includes a hopper 15 being hinged on a base 16 that is transversely connected to the longitudinal frame 7 of the machine. Each hopper 15 is driven by a pneumatic cylinder 17 in order to assume a vertical position and an inclined position with respect to the vertical (not shown in the drawings). Downstream the hopper 15 there is a slide 18 in order to deliver the fruit half to the further treatment.

Situated below the longitudinal frame 7 is a conveyor means for bringing the fruit halves P back to the loading tank, if their supporting condition is considered incorrect, as mentioned above. Such conveyor means consists of a recycling belt conveyor 19 located below the fruit holding flight conveyor 4.

A plurality of flexible retaining members 20 are arranged at the rear end of the fruit holding flight conveyor 4.

In operation, the fruit halves P are fished from the loading tank 1 through the inclined belt 2 with profiles that is movable according to the arrow F, and are poured in the shuffle feeder 3. The shuffle feeder 3 puts the fruit halves P on the fruit holding flights 6 of the conveyor 4 that advances in the longitudinal frame 7 of the machine. In the detecting station 9 the video camera 10 of each advancing line of the fruit halves P detects the supporting condition of each fruit half on its advancing lane for the next cut, and the presence of the pit or pit fragments, if any, in the fruit half, which is not shown.

If a fruit half is not positioned correctly in the fruit holding flight 6, that is, with its inner part facing upward, the control unit 12 communicates the information to the cutting station 8 and the separating station 13: the fruit half in question will not be subjected to cutting and the hopper 15 of the concerned selective discharge unit 14 will be placed in a vertical position to allow the fruit half to fall on the recycling belt conveyor 19 for returning to the loading tank 1 and restarting the cycle described.

If the fruit half P is properly positioned in the fruit holding flight 6, but still has the pit or pit fragments, it will undergo a cut at the cutting station 8, the hopper 15 will be placed in an inclined position with respect to the vertical, and the fruit half will be delivered to the further treatment, not described here.

If the fruit half P is properly positioned in the fruit holding flight 6, but has no pit or pit fragments, it will not undergo a cutting at the cutting station 8; as in the previous case, the hopper 15 will be placed in an inclined position with respect to the vertical and the fruit half P will be delivered for the further treatment.

Figure 4:
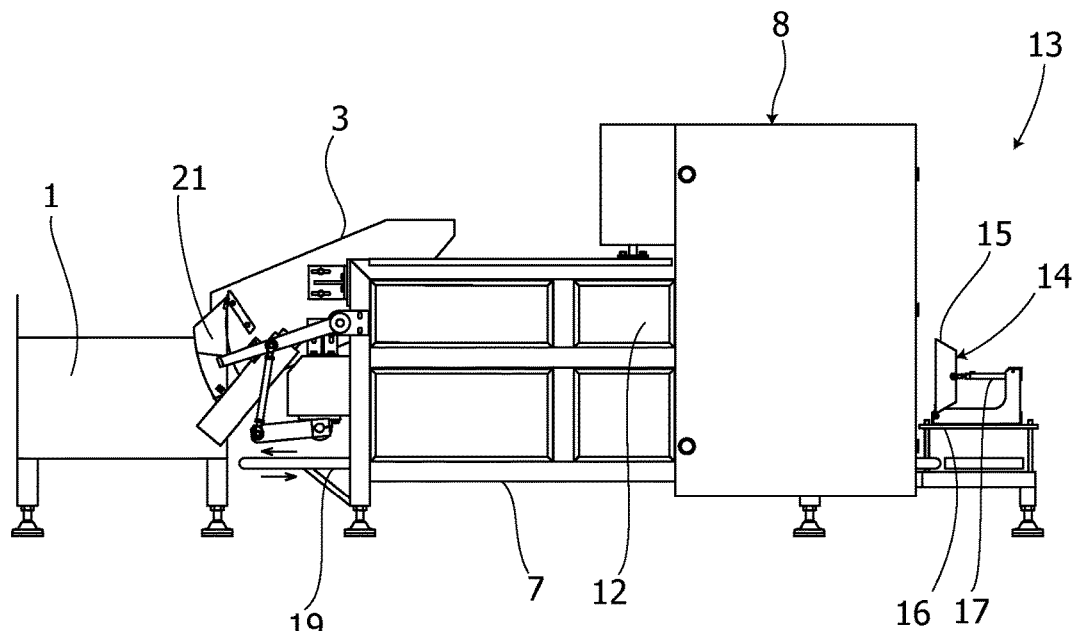
FIGS. 4 and 5 are schematic side views of a second embodiment of the multiple lane machine for pitting and re-pitting fruit halves, the machine being equipped with a different lifting device of the fruit halves shown in a lowered and a raised position respectively.
Figure 5:
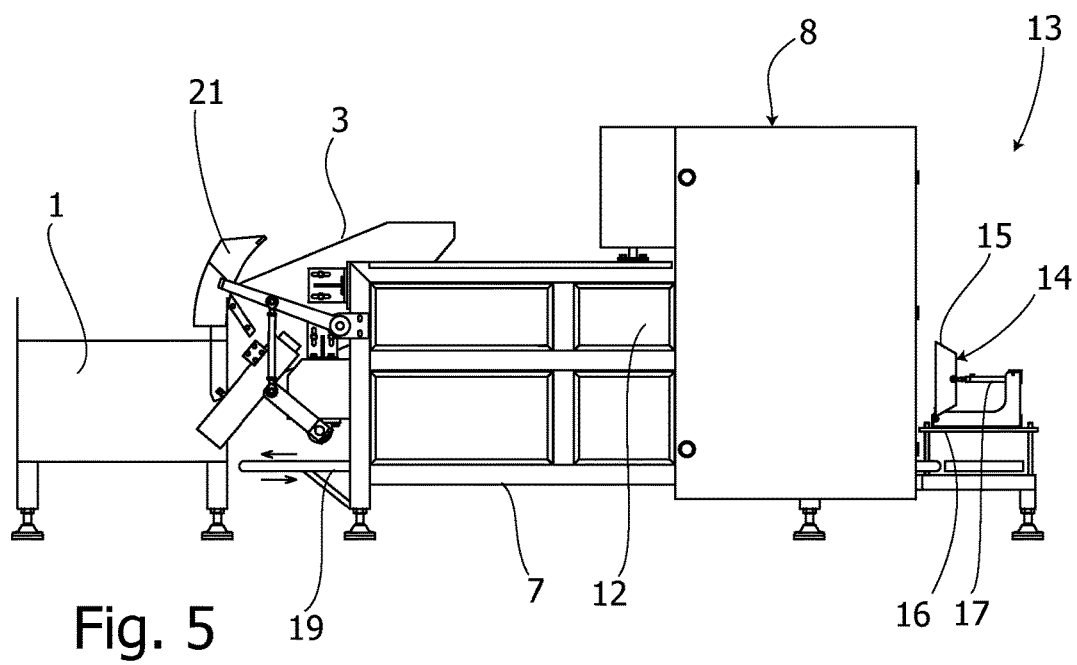

It should be evident that the machine described above could be modified in some of its parts. Refer, in this regard, to FIGS. 4 and 5, which are schematic side views of a second embodiment of the multiple lane machine for pitting and re-pitting fruit halves. In these figures, the same numeral references are used to indicate the same parts in FIG. 1. Differently from the first embodiment, a basket lift device 21 of known type is used instead of the inclined belt 2 with profiles, the basket lift device being shown in a lowered position and raised position, respectively.

The invention claimed is:

1. A method for pitting and re-pitting fruit halves comprising the steps of:
    lifting the fruit halves from a loading area to a feeding zone,
    feeding the fruit halves to an advancing lane,
    moving the fruit halves forward,
    removing pit or pit fragments from the fruit halves, and delivering the fruit halves to their further treatment, characterized in that the method further comprises:
        detecting a supporting condition of each fruit half on its advancing lane for allowing the removal of pit or pit fragments, and a presence of pit or pit fragments, if any, in the fruit half;
        assessing said supporting condition as correct or incorrect;
        communicating the presence of pit or pit fragments, if any, in the fruit half, as a useful information for removing the pit or pit fragments and delivering the fruit halves to their further treatment; and bringing the fruit halves, whose supporting condition is assessed as incorrect, back to the step of fruit half lifting from the loading area to the feeding zone.

2. A multi-lane machine for pitting and re-pitting fruit halves comprising a loading tank (1), an elevator for fruit halves (P), a shuffle feeder (3), a fruit holding flight conveyor (4) in which a belt composed of mesh elements (5) and fruit holding flights (6) advances in a longitudinal frame (7) of the machine up to a cutting station (8), which is provided with knives for removing the pit or pit fragments, if any, from fruit halves, characterized in that the machine further comprises:
- a detecting station (9) for detecting a supporting condition of each fruit half (P) on its advancing lane for allowing the removal of pit or pit fragments in the cutting station, and a presence of pit or pit fragments, if any, in the fruit half (P);
- a control unit (10) for assessing as correct or incorrect the supporting condition of the fruit half;
- communication means for sending information about the presence of the pit or pit fragment, if any, in the fruit half (P), to the cutting station (8) for removing the pit or pit fragments and to a separating station (13) for delivering the fruit halves to their further treatment; and
- conveying means for bringing the fruit halves back to the loading tank (1) for the fruit halves, in case their supporting condition is assessed as incorrect.

3. The machine according to claim 2, wherein said detection station (9) is constituted by a plurality of video cameras (10), one for each advancing lane of the fruit halves.

4. The machine according to claim 3, wherein the plurality of video cameras (10) is mounted on a portal (11) fixed transversely to the longitudinal frame (7) of the machine.

5. The machine according to claim 2, wherein said separating station (13) comprises a plurality of selective unloading units (14), one for each advancing lane of the fruit halves, each selective unloading unit (14) including a hopper (15) hinged on a base (16) attached transversely to the longitudinal frame (7) of the machine and driven by a pneumatic cylinder (17) in order to assume a vertical position when the arriving fruit half (P) must return to the tank load (1) and a position inclined to the vertical when the arriving fruit half (P) must be conveyed to its further processing.

6. The machine according to claim 2, wherein said conveying means for the return to the loading tank of the fruit halves are constituted by a recycling belt conveyor (19) located below the fruit holding flight conveyor (4).

7. The machine according to claim 6, wherein the fruit holding flight conveyor (4) is flanked by flexible retaining means (20) adapted to direct the fruit halves outgoing from the fruit holding flight conveyor (4).

8. The machine according to claim 2, wherein the elevator for fruit halves (P) is an inclined belt (2) with profiles.

9. The machine according to claim 2, wherein the elevator for fruit halves (P) is a basket lift device (21).

10. The method of claim 1 wherein the fruit halves are peach halves.

11. The machine of claim 2, wherein the fruit halves are peach halves.

* * * * *